US012682766B2

(12) United States Patent
Caprace et al.

(10) Patent No.: US 12,682,766 B2
(45) Date of Patent: Jul. 14, 2026

(54) AIRCRAFT WAKE SENSING

(71) Applicant: UNIVERSITE CATHOLIQUE DE LOUVAIN, Louvain-la-Neuve (BE)

(72) Inventors: Denis-Gabriel Caprace, Louvain-la-Neuve (BE); Philippe Chatelain, Louvain-la-Neuve (BE); Ignace Ransquin, Louvain-la-Neuve (BE)

(73) Assignee: UNIVERSITE CATHOLIQUE DE LOUVAIN, Louvain-la-Neuve (BE)

( * ) Notice: Subject to any disclaimer, the term of this patent is extended or adjusted under 35 U.S.C. 154(b) by 122 days.

(21) Appl. No.: 18/018,187

(22) PCT Filed: Jul. 30, 2021

(86) PCT No.: PCT/EP2021/071502
§ 371 (c)(1),
(2) Date: Jan. 26, 2023

(87) PCT Pub. No.: WO2022/023574
PCT Pub. Date: Feb. 3, 2022

(65) Prior Publication Data

US 2023/0267841 A1 Aug. 24, 2023

(30) Foreign Application Priority Data

Jul. 30, 2020 (EP) .................................... 20188776

(51) Int. Cl.
*G08G 5/30* (2025.01)
*G08G 5/25* (2025.01)

(52) U.S. Cl.
CPC ................ *G08G 5/30* (2025.01); *G08G 5/25* (2025.01)

(58) Field of Classification Search
CPC .... G08G 5/003; G08G 5/0008; G08G 5/0021; G08G 5/0091; G08G 5/30; G08G 5/25;
(Continued)

(56) References Cited

U.S. PATENT DOCUMENTS 10,876,920 B1 * 12/2020 McFarland ........... G01M 9/065
2014/0214243 A1 * 7/2014 Whitehead ........... G05D 1/0202 701/3
(Continued)

OTHER PUBLICATIONS

Denis-Gabriel Caprace, Gregoire S. Winckelmans, Philippe Chatelain, Jeff Eldredge "Wake Vortex Detection and Tracking for Aircraft Formation Flight" AIAA Aviation 2019 Forum, Jun. 15, 2019 https://arc.aiaa.org/doi/abs/10.2514/6.2019-3329(Year: 2019).*
(Continued)

*Primary Examiner* — Hitesh Patel
*Assistant Examiner* — Ashleigh Nicole Turnbaugh
(74) *Attorney, Agent, or Firm* — KARCESKI IP LAW, PLLC

(57) ABSTRACT

A wake produced by a leader aircraft and experienced by a follower aircraft is sensed by repetitively carrying out the following operations in an iterative manner. Measurements carried out by the follower aircraft are estimated based on a simulated response of the follower aircraft to an estimated aerodynamic context. The estimated aerodynamic context includes a model of the wake and an estimated position of the follower aircraft with respect to the model of the wake and data indicating aerodynamic effects experienced by the follower aircraft due to its own motion. The estimated aerodynamic context is adjusted based on a comparison between the measurements that have been estimated and actual measurements carried out by the follower aircraft, aiming to reduce a deviation between the measurements that have been estimated and the actual measurements. Informa-
(Continued)

tion on the wake is extracted from the estimated aerodynamic context.

15 Claims, 2 Drawing Sheets

(58) Field of Classification Search
CPC . G08G 5/76; G08G 5/21; G05D 1/104; G01P 13/025; B64D 45/00
USPC .............................................................. 701/3
See application file for complete search history.

(56) References Cited

U.S. PATENT DOCUMENTS

| | | | | |
|---|---|---|---|---|
| 2017/0267371 | A1* | 9/2017 | Frolov | G01F 1/32 |
| 2017/0269612 | A1* | 9/2017 | Frolov | B64D 43/02 |
| 2018/0348796 | A1* | 12/2018 | Torralba | G05D 1/0825 |
| 2019/0041876 | A1* | 2/2019 | Robin | G08G 5/0052 |
| 2019/0287417 | A1* | 9/2019 | Kono | G09B 9/307 |

OTHER PUBLICATIONS

International Search Report and Written Opinion dated Nov. 11, 2021, for International Patent Application No. PCT/EP2021/071502.
Klaus-Uwe Hahn et al: "Alleviation of Atmospheric Flow Disturbance Effects on Aircraft Response," 26th Congress of International Council of the Aeronautical Sciences, ICAS 2008, Jan. 1, 2008, pp. 1-16.
Ransquin Ignace et al: "Wake Vortex Detection and Tracking for Aircraft Formation Flight," Journal of Guidance, Control and Dynamics, Aug. 23, 2021, pp. 1-19.

* cited by examiner

AIRCRAFT WAKE SENSING

CROSS-REFERENCE TO RELATED APPLICATION(S)

This is a National Stage Entry into the United States Patent and Trademark Office from International Patent Application No. PCT/EP2021/071502, filed on Jul. 30, 2021, which relies on and claims priority to European Patent Application No. 20188776.7, filed on Jul. 30, 2020, the entire contents of both of which are incorporated herein by reference.

FIELD OF THE INVENTION

An aspect of the invention relates to a method of sensing a wake produced by a leader aircraft and experienced by a follower aircraft. The method may be used, for example, when aircraft fly in formation, whereby these aircraft may be civil aircraft. The method may be carried out, for example, by a flight computer in a follower aircraft. Further aspects of the invention relate to a flight control method, a computer program, and a flight computer.

BACKGROUND OF THE INVENTION

Aircraft may fly in formation whereby a follower aircraft flies behind a leader aircraft. The follower aircraft may experience a wake generated by the leader aircraft. This may have a beneficial effect or an adverse effect depending on the wake and on the position of the follower aircraft in the wake. For example, an appropriate position may provide drag reduction for the follower aircraft, which may result in fuel savings.

The follower aircraft may comprise a so-called peak seeking system that finds and maintains a desired position in the wake. In order to do so, the peak seeking system needs to obtain information on the wake and on the present position of the follower aircraft in the wake. This information may be obtained, at least partially, through a communication link between the leader aircraft and the follower aircraft. Information on the wake may also, or additionally, be provided by specific measurement equipment, such as, for example, light ranging and detection (LIDAR) equipment or dedicated pressure probes, or a combination of these.

Patent publication US2014214243A1 describes an apparatus for controlling a formation flight of a trailing aircraft relative to a vortex generated by a leading aircraft. In the apparatus, a position module determines a position of the vortex relative to the trailing aircraft. A peak-seeking module determines a desired position of the trailing aircraft for providing desired vortex-induced aerodynamic benefits based on the position of the vortex relative to the trailing aircraft and a mapping function of an individual performance metric. A limiter module modifies the desired position of the trailing aircraft to avoid unintended crossings of the trailing aircraft into the vortex. A control module controls flight of the trailing aircraft based the desired position of the trailing aircraft or the modified desired position of the trailing aircraft.

SUMMARY OF THE INVENTION

There is a need for an improved solution that allows a follower aircraft to obtain information on a wake produced by a leader aircraft, whereby an improvement resides in at least one of the following aspects: ease of implementation and cost.

In accordance with an aspect of the invention, there is provided a method of sensing a wake produced by a leader aircraft and experienced by a follower aircraft, the method comprising repetitively carrying out the following two operations in an iterative manner:

- estimating measurements carried out by the follower aircraft based on a simulated response of the follower aircraft to an estimated aerodynamic context that includes, on the one hand, a model of the wake and an estimated position of the follower aircraft with respect to the model of the wake and, on the other hand, data indicating aerodynamic effects experienced by the follower aircraft due to its own motion; and
- adjusting the estimated aerodynamic context based on a comparison between the measurements that have been estimated and actual measurements carried out by the follower aircraft, aiming to reduce a deviation between the measurements that have been estimated and the actual measurements;

the method further comprising:

- extracting information on the wake from the estimated aerodynamic context.

The method exploits the fact that a part of an estimated aerodynamic context concerns the follower aircraft itself. This part can be estimated relatively accurately through modeling and measurements. In fact, in the absence of a wake, the actual measurements will match measurements estimated on the basis of aircraft modeling quite well. The wake is a disturbance, which creates a deviation between estimated measurement and actual measurements. This deviation is exploited to learn more about the wake based on general a priori knowledge of the wake expressed by the model of the wake. Iterations based on adjusting the estimated aerodynamic context, which comprises a relatively well-known part concerning the follower aircraft itself and a part to know better, the wake, reduces the deviation and thus provide information about the wake.

The method allows the follower aircraft to obtain information on the wake, and an indication of its position therein, using measurement equipment and control software that is typically already present in aircraft, in particular in commercial aircraft. The follower aircraft need not comprise specific, additional measurement equipment for wake sensing. Sufficiently accurate and precise wake sensing may easily and cost-effectively be achieved by adding software to a flight computer, which enables a processor in the flight computer to carry out the method defined hereinbefore. What is more, the wake sensing method can be carried out without communication between the leader aircraft and the follower aircraft.

In accordance with a further aspect of the invention, there is provided a method of controlling a flight of a follower aircraft that flies behind a leader aircraft. In accordance with yet further aspects of the invention, there is provided a computer program and a flight computer.

For the purpose of illustration, some embodiments of the invention are described in detail with reference to accompanying drawings. In this description, additional features will be presented, some of which are defined in the dependent claims, and advantages will be apparent.

DESCRIPTION OF EMBODIMENT(S) OF THE INVENTION

Figure 1:
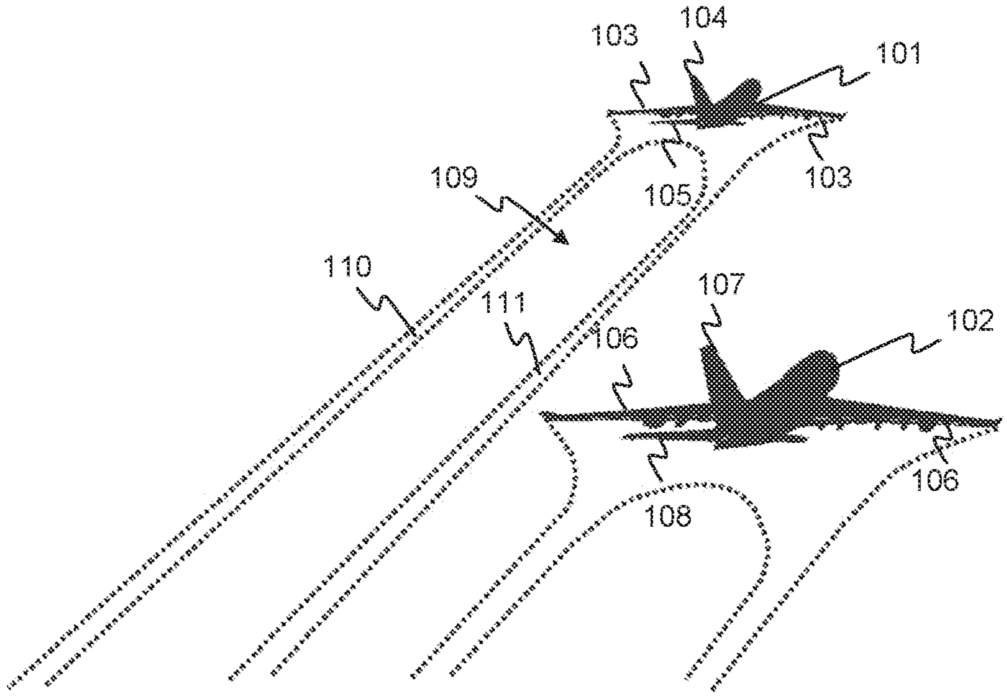
FIG. 1 is a pictorial diagram of a flight situation with a leader aircraft and a follower aircraft.

FIG. 1 schematically illustrates a flight situation with a leader aircraft 101 and a follower aircraft 102. FIG. 1 provides a pictorial diagram of this flight situation. The leader aircraft 101 has a standard structure comprising a main wing 103, a vertical tail plane 104, and a horizontal tail plane 105. The same applies to the follower aircraft 102, which also has a main wing 106, a vertical tail plane 107, and a horizontal tail plane 108.

The leader aircraft 101 generates a wake 109. The wake 109 may comprise two vortices 110, 111. One wake vortex 110 emanates from a tip of the main wing, another wake vortex 111 emanates from the other tip of the main wing. In general, generation of lift leads to a flow below a wing, around a tip of the wing into a region above the wing where pressure is lower. This generally generates a vortex at the tip of the wing.

The follower aircraft 102 may experience the wake 109 generated by the leader aircraft 101. That is, the follower aircraft 102 experiences an aerodynamic context that may include this wake 109. The two wake vortices 110, 111 generate vertical wind patterns, which may positively or negatively affect flight conditions for the follower aircraft 102. This depends on a position of the follower aircraft 102 in the wake 109, in particular the position with respect to the two wake vortices 110, 111. In case the follower aircraft 102 is appropriately positioned in the wake 109, the follower aircraft 102 may experience drag reduction, which allows fuel savings.

The aforementioned may also apply when the follower aircraft 102 is flying at a relatively large distance behind the leader aircraft 101. This is typically the case in civil aviation where a minimum distance between aircraft should be respected for safety reasons. For example, the follower aircraft 102 may be flying at several tens of wingspans downstream of the leader aircraft 101. Nonetheless, even at such distances, the follower aircraft 102 may still benefit from a positive interaction with the wake vortices 110, 111. This is because these are generally long-lasting and thus extend over relatively large distances with sufficient intensity.

However, drag reduction is very sensitive to a positioning of the follower with respect to the wake vortices 110, 111. What is more, the wake vortices 110, 111 may vary in location due to instabilities, such as, for example, wake meandering, and due to external factors, such as, for example, a meteorological phenomenon. It is therefore desired that the follower aircraft be able to continuously locate and track the wake vortices at a sufficiently high accuracy. This allows the follower aircraft 102 to maintain an advantageous position in the wake 109, in terms of, for example, fuel saving, flight safety, or flight comfort, or a combination thereof.

Figure 2:
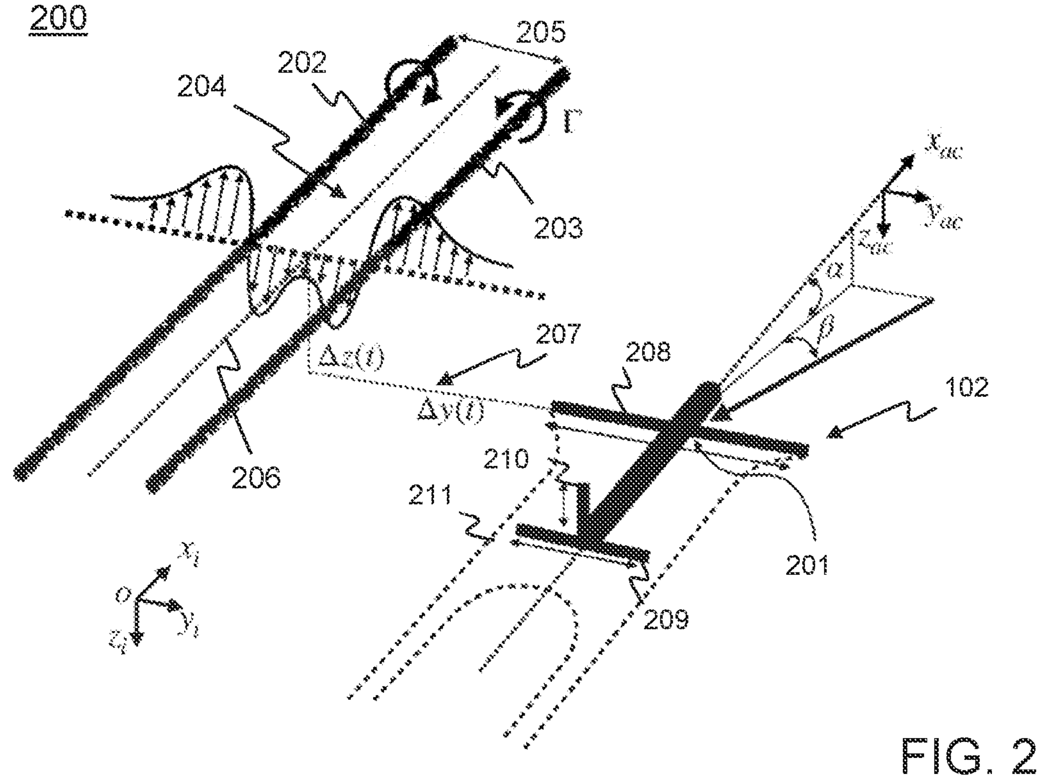
FIG. 2 is a conceptual diagram of an aerodynamic context experienced by the follower aircraft.

FIG. 2 schematically illustrates an aerodynamic context 200 experienced by the follower aircraft 102. FIG. 2 provides conceptual diagram of the aerodynamic context 200. The follower aircraft 102 is located at an inertial position 201 designated in FIG. 2.

The wake 109 of the leader aircraft 101 is modeled as two counter-rotating vortex tubes 202, 203 of circulation jointly designated by the symbol Γ. In this wake model 204 there is a spacing 205 between these vortex tubes 202, 203 and a center line 206 along which the vortex tubes 202, 203 are aligned. The vortex tubes 202, 203 are further aligned along an inertial axis $x_i$ of a Cartesian coordinate system $x_i$, $y_i$, $z_i$ indicated in FIG. 2.

The follower aircraft 102 has a position 207 with respect to the wake model 204 that is defined as relative to the center line 206. More specifically, this relative position 207 is expressed as an offset $\Delta y(t)$ along an y axis of the aforementioned coordinate system, and an offset $\Delta z(t)$ along a z axis. These offsets $\Delta y(t)$, $\Delta z(t)$ can be regarded as a side distance and a height distance, respectively. In addition, the follower aircraft 102 has an angular position with respect to the wake model 204.

The follower aircraft 102 is modelled by means of a main wing 208 characterized by a center and a span, a horizontal tail plane 209 having a span, and a vertical tail plane 210 having a span. The aforementioned tail planes 209, 210 are located at a distance from the center of the main wing 208. In this embodiment, a wake of the follower aircraft 102 is modeled as a flat vortex sheet 211 extending backwards from the main wing 208, and two perpendicular vortex sheets produced by the vertical tail plane and the horizontal. All those vortex sheets are assumed to go straight to infinity. The flat vortex sheet 211 from the main wing 208 induces a downwash on the tail of the follower aircraft 102. This downwash may be modeled as a horseshoe vortex. Accordingly, loads on the tail, which affect a longitudinal and a lateral behavior of the follower aircraft 102 may be taken into account.

The wake of the leader aircraft represented by the model 204 induces flow velocities on the main wing 208, the horizontal tail plane 209, and the vertical tail plane 210. These wake-induced flow velocities depend on the relative position 207 of the follower aircraft 102 as well as its angular position with respect to the wake model 204, in addition to the translational and angular speeds of the follower aircraft 102. The wake-induced flow velocities may be combined with a modeled dynamic behavior of the follower aircraft 102 to determine a relative flow velocity vector. Aerodynamic angles, such as, for example, angle of attack $\alpha$ and angle of slip $\beta$ may be computed from the relative flow velocity vector being perceived at a center of mass of the follower aircraft 102.

Lift and drag forces and moments experienced by the follower aircraft 102 may be estimated on the basis of a lifting line theory, such as, for example, the Prandtl lifting line theory. Given a set of lifting lines, a circulation distribution may be calculated along each lifting line by solving an integro-differential equation that relates circulation with relative flow velocity. The relative flow velocity is a combination of various flow velocities, which are induced by movement of the follower aircraft 102, by the wake 109 of the leader aircraft 101, and by the lifting lines themselves. The lift and drag forces and the moments can be deduced from circulation distributions that have been calculated in this manner.

A model simulating dynamic behavior of the follower aircraft 102 may take into account the lift and drag forces and moments experienced by the follower aircraft 102. This model, which will be referred to hereinafter as aircraft simulator, operates on variables representing six degrees of freedom: position on a longitudinal axis, position on a transverse axis, position on a height axis, angle of roll, angle of pitch, and angle of yaw. The aircraft simulator may further operate on the time derivatives of these six degrees of freedom, which are speed along the longitudinal axis, speed along the transverse axis, speed along the height axis, roll rate, pitch rate, and yaw rate.

The aircraft simulator may predict position and velocity of the follower aircraft 102. The aircraft simulator may thus predict a change in the aerodynamic context 200 illustrated in FIG. 2. A translation or a rotation, or both, of the follower aircraft 102, as well as a translation or a rotation, or both, of the wake model 204, may change air velocities along the lifting lines mentioned hereinbefore. This, in turn, may affect the lift and drag forces and moments experienced by the follower aircraft 102, which may change the aforementioned aerodynamic angles as well as other measurable aerodynamic parameters. Since the aircraft simulator takes into account the lift and drag forces and moments, there is thus a strong coupling between the aerodynamic context 200 illustrated in FIG. 2 and the aircraft simulator.

Figure 3:
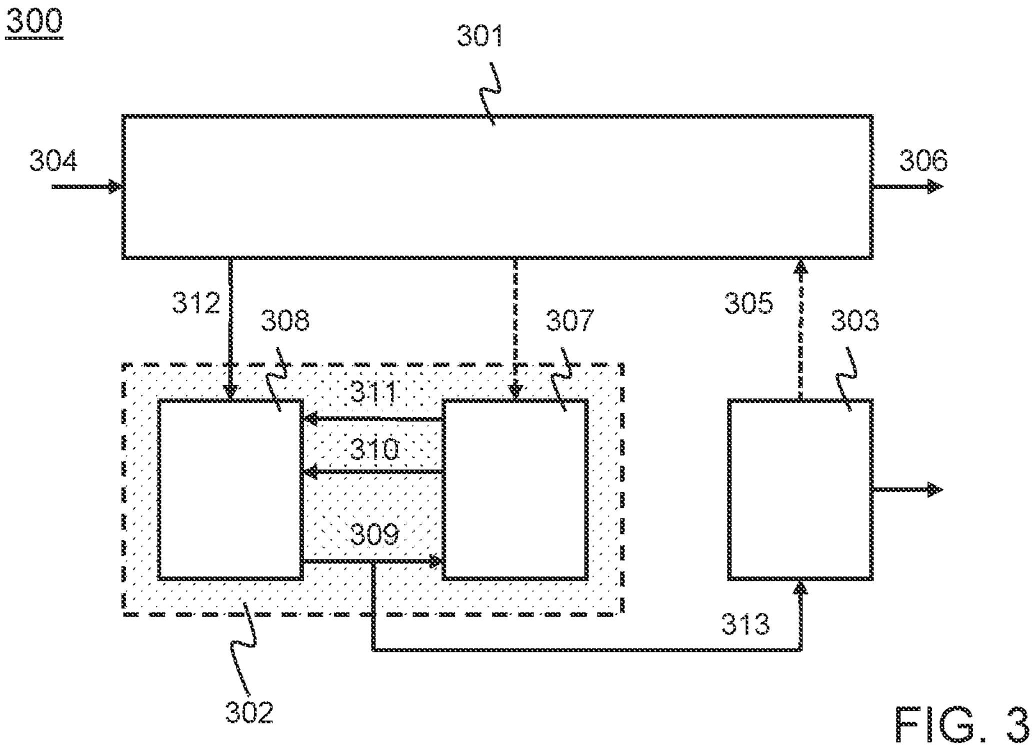
FIG. 3 is a block diagram of a flight computer in the follower aircraft, which comprises a wake estimator.

FIG. 3 schematically illustrates a flight computer 300 in the follower aircraft 102. FIG. 3 provides a block diagram of the flight computer 300. The flight computer 300 comprises various functional entities, which are schematically represented as blocks: a flight controller 301, a wake estimator 302, and a wake analyzer 303. Any of these functional entities may be implemented, at least partially, by means of a computer program that enables a processor in the flight computer 300 to carry out various operations. These operations will be described hereinafter in relation with the functional entity concerned. The operations that the flight controller 301, the wake estimator 302, and the wake analyzer 303 carry out constitute a flight control method, a wake sensing method, and a wake analysis method, respectively.

The flight computer 300 basically operates as follows. The flight controller 301 receives data 304 of various measurements that the follower aircraft 102 carries out. These measurements may comprise measurements typically carried out by commercial aircraft. The latter measurements may include at least one of the following: angle of incidence, angle of slip, inertial position, velocity, attitude, angular velocity, as well as translational and angular accelerations.

The flight controller 301 further receives a target trajectory 305. The target trajectory 305 may at least partially be defined by output data from the wake analyzer 303. For example, the output data from the wake analyzer 303 may indicate positions in the wake 109 of the leader aircraft 101 where the follower aircraft 102 may benefit from drag reduction. The output data of the wake analyzer 303 may further provide indications of drag reduction benefits associated with these positions. This will be described in greater detail hereinafter.

The flight controller 301 provides control outputs 306 on the basis of measurement data and the target trajectory 305 to be followed. The flight controller 301 may include a so-called autopilot that implements a control strategy on which the control outputs 306 are based.

The wake estimator 302 basically comprises two functional entities: a dynamic response simulator 307 and an estimation adjuster 308. The dynamic response simulator 307 receives an estimated aerodynamic context 309. The estimated aerodynamic context 309 includes a model of the wake and an estimated position of the follower aircraft 102 with respect to the model of the wake. This has been illustrated in FIG. 2. The model of the wake may thus correspond to the wake model 204 illustrated in FIG. 2 described hereinbefore. The estimated aerodynamic context 309 may include further data indicating flow velocities experienced by the follower aircraft 102 due to, for example, its own motion, as well its operational state. For example, this further data of the aerodynamics may comprise the aforementioned six degrees of freedom of the follower aircraft 102 and the time derivatives of these. The data indicating the operational state of the follower aircraft may pertain to flight control surfaces and thrust. The data may comprise control inputs for these.

The dynamic response simulator 307 provides a simulated response 310 of the follower aircraft 102 to an estimated aerodynamic context 309. The simulated response 310 may be based on the aircraft simulator mentioned hereinbefore. In fact, the dynamic response simulator 307 may be regarded as a flight simulator in the sense that the dynamic response simulator 307 should provide a sufficiently accurate representation of an actual dynamic response of the follower aircraft 102. Since, in flight, the follower aircraft 102 will generally have a relatively strong non-linear dynamic behavior, the dynamic response simulator 307 will typically provide the simulated response 310 on the basis of non-linear functions.

The simulated response 310 of the follower aircraft 102 provides an estimate 311 for at least some of the measurements that the follower aircraft 102 carries out. These estimated measurements 311 based on the simulated response 310 may include measurements that depend on an actual aerodynamic context perceived by the follower aircraft 102. Examples of such measurements include angle of incidence and angle of slip, mentioned hereinbefore in relation with the aerodynamic context 200 illustrated in FIG. 2, as well as other aerodynamic parameters, such as, for example, position, speed, and acceleration.

The estimation adjuster 308 compares the estimated measurements 311 based on the simulated response of the follower aircraft 102 with corresponding actual measurements 312 that the follower aircraft 102 carries out. The estimation adjuster 308 then adjusts the estimated aerodynamic context 309 on the basis of this comparison. A degree of adjustment may depend on indications of uncertainty, that is, possible errors, in the estimated measurements 311 and in the actual measurements 312. For example, in case the estimated measurements 311 are relatively uncertain whereas the actual measurements 312 are relatively precise, that is, reliable, the degree of adjustment will be relatively high. Conversely, in case confidence in the estimated measurements 311 is relatively large compared with possible errors in the actual measurements 312, the degree of adjustment will be relatively low.

Accordingly, the dynamic response simulator 307 will receive a new estimated aerodynamic context 309, which is an adjustment of the estimated aerodynamic context 309 that the dynamic response simulator 307 has previously received. The dynamic response simulator 307 may then provide a new simulated response 310 of the follower aircraft 102 to the new estimated aerodynamic context 309. New estimated measurements 311 may then be provided and compared with the actual measurements 312, which may have evolved in the meantime.

This process, which has been described hereinbefore, may iteratively continue and provide a relatively accurate estimation of the aerodynamic context. Since this context includes a model of the wake, information 313 on the wake 109 may be extracted from this estimation. Moreover, a relatively precise indication of the position of the follower aircraft 102 in the wake 109 may be obtained.

A remarkable feature is that the information 313 on the wake 109 and the indication of the position therein may be obtained using measurement equipment and control software that is typically already present in aircraft, in particular in commercial aircraft. The follower aircraft 102 need not comprise specific, additional measurement equipment for wake sensing. Sufficiently accurate and precise wake sensing may be achieved by adding software to the flight computer 300, which functionally provides the wake estimator 302 described hereinbefore. What is more, the wake sensing can be carried out without communication between the leader aircraft 101 and the follower aircraft 102.

Nonetheless, although not essential, the wake estimator 302 may benefit from information on the leader aircraft 101, for example, in order to improve efficiency or accuracy, or both. The information of the leader aircraft 101 may concern, for example, aircraft type, aircraft mass, or aircraft position, or any combination of these. The follower aircraft 102 may obtain this information through a communication link with the leader aircraft 101. The communication link may use, for example, an ADS-B protocol.

In this embodiment, the wake analyzer 303 processes the information 313 on the wake 109 that is extracted from the estimated aerodynamic context 309. The wake analyzer 303 may filter this information 313, which may have a noisy nature. This filtering may comprise, for example, techniques such as Gaussian filtering. The wake analyzer 303 can then detect generic patterns of the wake 109 based on the information 313 that has been filtered. The wake analyzer 303 may also detect a turbulence characteristic in the wake 109. The generic patterns of the wake 109 that have been detected may be used to predict behavior of the wake 109. The wake estimator 302 may use these wake predictions to increase accuracy or to achieve a desired level of accuracy faster, with fewer iterations. The wake analyzer 303 may provide the target trajectory 305 to the flight controller 301, as mentioned hereinbefore, in order to maintain a position allowing drag reduction, or otherwise enhance flight performance, safety, and passenger comfort.

Figure 4:
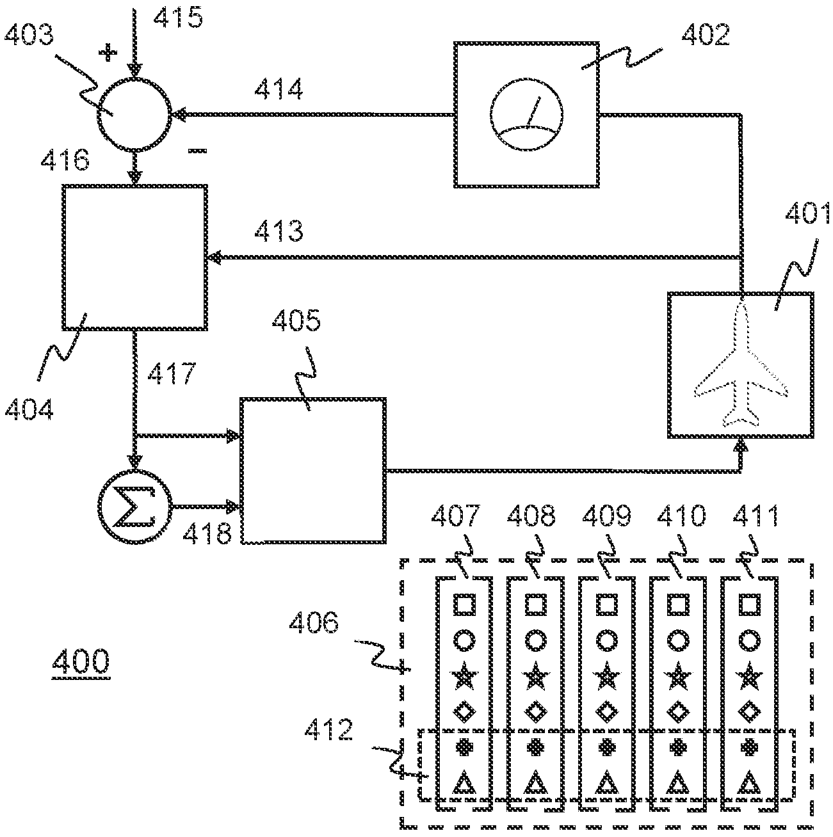
FIG. 4 is a functional diagram of an embodiment of the wake estimator.

FIG. 4 schematically illustrates an embodiment 400 of the wake estimator 302. FIG. 4 provides a functional diagram of this embodiment 400, which will be referred to as the wake estimator 400 for the sake of convenience. The wake estimator 400 illustrated in FIG. 4 is based on an ensemble Kalman filter architecture, which is one of various possible architectures as will be indicated hereinafter. In this embodiment, the wake estimator 400 comprises an aircraft state propagator 401, a measurement estimator 402, a comparator 403, an analyzer 404, and a covariance inflator 405.

In the wake estimator 400, an estimated aerodynamic context 406 is represented by a set of state vectors 407-411. In FIG. 4, five state vectors are represented for the sake of simplicity and convenience. In practice, the set of state vectors 407-411 may be larger. A state vector comprises a set of variables defining a possible aerodynamic context. In FIG. 4, variables are schematically represented by means of pictorial symbols. A group of variables 412 in the state vector relate to a wake model that is used, such as, for example, the wake model 204 illustrated in FIG. 2. Another group of variables may relate to the six degrees of freedom of the follower aircraft 102 and their derivatives mentioned hereinbefore. The state vector may comprise further variables that relate to measurement biases that can be taken into account.

The set of state vectors 407-411 thus represent various possible aerodynamic contexts. A mean vector can be calculated from the set of state vectors 407-411. The mean vector represents the estimated aerodynamic context 406. The set of state vectors 407-411 has a degree of heterogeneity that expresses a degree of uncertainty about the estimated aerodynamic context 406. In case the state vectors 407-411 in the set differ from each other to a relatively great extent, the degree of uncertainty is relatively high. Conversely, in case the state vectors 407-411 are relatively similar, the degree of uncertainty is relatively low. In that case, there is confidence the estimated aerodynamic context 406, which is expressed by the mean vector of the set.

The aircraft state propagator 401 generates a model-based new set of state vectors on the basis of a present set of state vectors 407-411. The model-based new set of state vectors represent a new estimated aerodynamic context 413 that is expected on the basis of a model of the follower aircraft 102 given the estimated aerodynamic context 406 that is presented as an input to the model. For a state vector of the set presented as an input, the aircraft state propagator 401 may calculate a new state vector by applying a complex non-linear matrix function that models the dynamic behavior of the follower aircraft 102. That is, the aircraft state propagator 401 may functionally be regarded as the aircraft simulator mentioned hereinbefore.

The measurement estimator 402 provides estimated measurements 414 on the basis of the model-based new set of state vectors. The estimated measurements 414 are also expressed by means of a set of measurement vectors, similar to the estimated aerodynamic context 406 being expressed by the set of state vectors 407-411. The measurement estimator 402 may calculate a measurement vector from a new state vector by applying a matrix function to the new state vector. The matrix function models measurements that are carried out by the follower aircraft 102.

The comparator 403 compares the estimated measurements 414 with actual measurements 415 carried out by the follower aircraft 102. The actual measurements 415 may also be expressed by means of a set of measurement vectors. Random differences may be enforced between measurement vectors in the set. This may be achieved by adding a random vector to a vector that comprises the actual measurements. This addition of randomness to the actual measurements may prevent spurious correlation in a measurement comparison result 416 that the comparator 403 provides. The measurement comparison result 416 is also expressed by means of a set of comparison vectors. A comparison vector is obtained by subtracting two corresponding measurement vectors from each other, one vector from the set representing actual measurements 415, the other vector from the set representing estimated measurements 414.

The analyzer 404 generates an aerodynamic context adjustment on the basis of the measurement comparison result 416. The aerodynamic context adjustment corresponds with a product of a so-called Kalman gain matrix and the set of comparison vectors that express the comparison result 416. The aerodynamic context adjustment is thus also in the form of a set of vectors, namely aerodynamic context adjustment vectors.

The Kalman gain matrix may be determined on the basis of the degree of uncertainty about the new estimated aerodynamic context 413, which is expressed by the model-based new set of state vectors. The Kalman gain matrix may further be determined on the basis of information on precision of the actual measurements 415, and an approximated relationship between state variables and measurements, which may be expressed as covariances. The Kalman gain matrix determines the degree of adjustment mentioned hereinbefore in the present embodiment, which is based on an ensemble Kalman filter architecture.

The analyzer 404 may subtract the aerodynamic context adjustment from the new estimated aerodynamic context 413, which is model-based. Accordingly, the analyzer 404 provides an adjusted new estimated aerodynamic context 417 in which the actual measurements 415 carried out by the follower aircraft 102 are accounted for. The adjusted new estimated aerodynamic context 417 is also in the form of a set of state vectors.

The covariance inflator 405 enhances differences between state vectors in the adjusted new estimated aerodynamic context 417. This covariance inflation prevents a situation where the Kalman gain matrix is populated with relatively small values making that the degree of adjustment is insignificant. In such a situation, the actual measurements 415 would not be accounted for, or at least not sufficiently be accounted for, which is generally not desired. The covariance inflator 405 may add a random vector to a state vector in the set concerned, whereby the random vector may have a Gaussian distribution and zero mean value. The covariance inflator 405 may further enhance a difference between the state vector and the mean state vector 418 of the set according to a technique that is referred to as relaxation to prior spread.

The covariance inflator 405 provides a final new set of state vectors, which expresses the estimated aerodynamic context 406 that will serve as a basis for a new iteration. The new iteration will start with the aircraft state propagator 401 generating a model-based new set of state vectors as described hereinbefore.

The embodiments described hereinbefore with reference to the drawings are presented by way of illustration. The invention may be implemented in numerous different ways. In order to illustrate this, some alternatives are briefly indicated.

The invention may be applied in numerous types of products or methods related to wake sensing. In the embodiments presented hereinbefore, a wake sensing method has been described that is based on an ensemble Kalman filter architecture. In other embodiments, wake sensing in accordance with the invention may be based on another architecture, such as, for example, an unscented Kalman Filter, a particle filter, or a neural network. In principle, any architecture capable of taking into account a relatively strong non-linear dynamic behavior may be suitable.

There are numerous different ways of modeling a wake for the purpose of wake sensing in accordance with the invention. In the presented embodiments, a wake model is used based on two rotating vortex tubes. In other embodiments, a wake model may comprise a single rotating vortex tube, or another aerodynamic entity, or set of aerodynamic entities, that may sufficiently accurately represent aircraft wake.

In general, there are numerous different ways of implementing the invention, whereby different implementations may have different topologies. In any given topology, a single entity may carry out several functions, or several entities may jointly carry out a single function. In this respect, the drawings are very diagrammatic. For example, the wake sensing as well as flight control in accordance with the invention may at least partially be carried out by various computing resources in a distributed manner, which is generally referred to as "cloud computing". Furthermore, there are numerous functions that may be implemented by means of hardware or software, or a combination of both. A description of a software-based implementation does not exclude a hardware-based implementation, and vice versa. Hybrid implementations, which comprise one or more dedicated circuits as well as one or more suitably programmed processors, are also possible. For example, various functions described hereinbefore with reference to the figures may be implemented by means of one or more dedicated circuits, whereby a particular circuit topology defines a particular function.

There are numerous ways of storing and distributing a set of instructions, that is, software, which allows wake sensing as well as flight control in accordance with the invention. For example, software may be stored in a suitable device readable medium, such as, for example, a memory circuit, a magnetic disk, or an optical disk. A device readable medium in which software is stored may be supplied as an individual product or together with another product, which may execute the software. Such a medium may also be part of a product that enables software to be executed. Software may also be distributed via communication networks, which may be wired, wireless, or hybrid. For example, software may be distributed via the Internet. Software may be made available for download by means of a server. Downloading may be subject to a payment.

The remarks made hereinbefore demonstrate that the embodiments described with reference to the drawings illustrate the invention, rather than limit the invention. The invention can be implemented in numerous alternative ways that are within the scope of the appended claims. All changes that come within the meaning and range of equivalency of the claims are to be embraced within their scope. Any reference sign in a claim should not be construed as limiting the claim. The verb "comprise" in a claim does not exclude the presence of other elements or other steps than those listed in the claim. The same applies to similar verbs such as "include" and "contain". The mention of an element in singular in a claim pertaining to a product, does not exclude that the product may comprise a plurality of such elements. Likewise, the mention of a step in singular in a claim pertaining to a method does not exclude that the method may comprise a plurality of such steps. The mere fact that respective dependent claims define respective additional features, does not exclude combinations of additional features other than those reflected in the claims.

The invention claimed is:

1. A method of sensing a wake produced by a leader aircraft and experienced by a follower aircraft, the method comprising:

providing a model simulating a dynamic behavior of the follower aircraft, the model operating on variables representing the following six degrees of freedom of the follower aircraft: position on a longitudinal axis, position on a transverse axis, position on a height axis, angle of roll, angle of pitch, and angle of yaw, the model further operating on time derivatives of the six degrees of freedom;

repetitively carrying out the following three operations in an iterative manner:

using the model simulating the dynamic behavior of the follower aircraft to simulate a response of the follower aircraft to an estimated aerodynamic context exclusively based on data only from the follower aircraft free from any data communicated by the leader aircraft, an estimated position of the follower aircraft with respect to a model of the wake, and data indicating aerodynamic effects experienced by the follower aircraft due to motion of the follower aircraft;

estimating measurements carried out by the follower aircraft based on the simulated response of the follower aircraft to the estimated aerodynamic context, whereby the measurements that are estimated are dependent on the position of the follower aircraft relative to the wake; and adjusting the estimated aerodynamic context based on a comparison between the measurements that have been estimated and actual measurements carried out by the follower aircraft to reduce a deviation between the measurements that have been estimated and the actual measurements;

extracting information on the wake from the estimated aerodynamic context; and using the information on the wake obtained to define a target for a flight controller in the follower aircraft.

2. The method of sensing the wake according to claim 1, wherein the model of the wake comprises at least one vortex tube positioned with respect to a reference axis, the estimated position of the follower aircraft being relative to the reference axis.

3. The method of sensing the wake according to claim 1, wherein the simulated response of the follower aircraft is based on an aerodynamic model of the follower aircraft and a control behavior implemented by a flight control module in the follower aircraft.

4. The method of sensing the wake-according to claim 3, wherein the aerodynamic model of the follower aircraft is based on at least one of the following aerodynamic modelling techniques: Prandtl's lifting line, doublet lattice method, and vortex lattice method, an empirical model based on calibrated coefficients.

5. The method of sensing the wake according to claim 1, wherein the measurements that are estimated and actually carried out comprise measurements typically carried out by commercial aircraft including at least one of the following measurements: angle of incidence, angle of slip, inertial position, velocity, attitude, angular velocity, translational acceleration, and angular acceleration.

6. The method of sensing the wake according to claim 1, wherein the estimating and the adjusting is done by means of a recursive filter.

7. The method of sensing the wake according to claim 6, wherein the recursive filter is one of the following: an ensemble Kalman filter, an unscented Kalman filter, a particle filter, and a neural-network based filter.

8. The method of sensing the wake according to claim 6, wherein the recursive filter operates on a state vector that comprises at least one variable of the model of the wake, at least one variable expressing the position of the follower aircraft with respect to the model of the wake, and a set of variables of a model of the follower aircraft as a dynamic system.

9. The method of sensing the wake-according to claim 1, wherein the method is carried out by a flight computer in the follower aircraft.

10. A method of controlling a flight of a follower aircraft that flies behind a leader aircraft, the method comprising:

obtain information on a wake produced by the leader aircraft and experienced by the follower aircraft by;

providing a model simulating a dynamic behavior of the follower aircraft, the model operating on variables representing the following six degrees of freedom of the follower aircraft: position on a longitudinal axis, position on a transverse axis, position on a height axis, angle of roll, angle of pitch, and angle of yaw, the model further operating on time derivatives of the six degrees of freedom;

repetitively carrying out the following three operations in an iterative manner:

using the model simulating the dynamic behavior of the follower aircraft to simulate a response of the follower aircraft to an estimated aerodynamic context exclusively based on data only from the follower aircraft free from any data communicated by the leader aircraft, an estimated position of the follower aircraft with respect to a model of the wake, and data indicating aerodynamic effects experienced by the follower aircraft due to motion of the follower aircraft;

estimating measurements carried out by the follower aircraft based on the simulated response of the follower aircraft to the estimated aerodynamic context, whereby the measurements that are estimated are dependent on the position of the follower aircraft relative to the wake; and adjusting the estimated aerodynamic context based on a comparison between the measurements that have been estimated and actual measurements carried out by the follower aircraft to reduce a deviation between the measurements that have been estimated and the actual measurements;

extracting the information on the wake from the estimated aerodynamic context; and using the information on the wake obtained to define a target for a flight controller in the follower aircraft.

11. The method of controlling the flight according to claim 10, wherein using the information on the wake comprises:

filtering the information on the wake that is extracted from the estimated aerodynamic context; and at least one of the following operations based on information on the wake that has been filtered:

detecting generic patterns of the wake; and detecting at least a turbulence characteristic in the wake.

12. A non-transitory machine readable storage medium on which a computer program is stored, the computer program enabling a processor to;

provide a model simulating a dynamic behavior of a follower aircraft, the model operating on variables representing the following six degrees of freedom of the follower aircraft: position on a longitudinal axis, position on a transverse axis, position on a height axis, angle of roll, angle of pitch, and angle of yaw, the model further operating on time derivatives of the six degrees of freedom;

repetitively carry out the following three operations in an iterative manner:

use the model simulating the dynamic behavior of the follower aircraft to simulate a response of the follower aircraft to an estimated aerodynamic context exclusively based on data only from the follower aircraft free from any data communicated by a leader aircraft, an estimated position of the follower aircraft with respect to a model of the wake, and data indicating aerodynamic effects experienced by the follower aircraft due to motion of the follower aircraft;

estimate measurements carried out by the follower aircraft based on the simulated response of the follower aircraft to the estimated aerodynamic context, whereby the measurements that are estimated are dependent on the position of the follower aircraft relative to the wake; and adjust the estimated aerodynamic context based on a comparison between the measurements that have been estimated and actual measurements carried out by the follower aircraft to reduce a deviation between the measurements that have been estimated and the actual measurements;

extract the information on the wake from the estimated aerodynamic context; and use the information on the wake obtained to define a target for a flight controller in the follower aircraft.

13. A flight computer adapted to;

provide a model simulating a dynamic behavior of a follower aircraft, the model operating on variables representing the following six degrees of freedom of the follower aircraft: position on a longitudinal axis, position on a transverse axis, position on a height axis, angle of roll, angle of pitch, and angle of yaw, the model further operating on time derivatives of the six degrees of freedom;

repetitively carry out the following three operations in an iterative manner:

use the model simulating the dynamic behavior of the follower aircraft to simulate a response of the follower aircraft to an estimated aerodynamic context exclusively based on data only from the follower aircraft free from any data communicated by a leader aircraft, an estimated position of the follower aircraft with respect to a model of the wake, and data indicating aerodynamic effects experienced by the follower aircraft due to motion of the follower aircraft;

estimate measurements carried out by the follower aircraft based on the simulated response of the follower aircraft to the estimated aerodynamic context, whereby the measurements that are estimated are dependent on the position of the follower aircraft relative to the wake; and adjust the estimated aerodynamic context based on a comparison between the measurements that have been estimated and actual measurements carried out by the follower aircraft to reduce a deviation between the measurements that have been estimated and the actual measurements;

extract the information on the wake from the estimated aerodynamic context; and use the information on the wake obtained to define a target for a flight controller in the follower aircraft.

14. A non-transitory machine readable storage medium on which a computer program is stored, the computer program enabling a processor to;

obtain information on a wake produced by a leader aircraft and experienced by a follower aircraft by;

providing a model simulating a dynamic behavior of the follower aircraft, the model operating on variables representing the following six degrees of freedom of the follower aircraft: position on a longitudinal axis, position on a transverse axis, position on a height axis, angle of roll, angle of pitch, and angle of yaw, the model further operating on time derivatives of the six degrees of freedom;

repetitively carrying out the following three operations in an iterative manner:

using the model simulating the dynamic behavior of the follower aircraft to simulate a response of the follower aircraft to an estimated aerodynamic context exclusively based on data only from the follower aircraft free from any data communicated by the leader aircraft, an estimated position of the follower aircraft with respect to a model of the wake, and data indicating aerodynamic effects experienced by the follower aircraft due to motion of the follower aircraft;

estimating measurements carried out by the follower aircraft based on the simulated response of the follower aircraft to the estimated aerodynamic context, whereby the measurements that are estimated are dependent on the position of the follower aircraft relative to the wake; and adjusting the estimated aerodynamic context based on a comparison between the measurements that have been estimated and actual measurements carried out by the follower aircraft to reduce a deviation between the measurements that have been estimated and the actual measurements;

extracting the information on the wake from the estimated aerodynamic context; and using the information on the wake obtained to define a target for a flight controller in the follower aircraft.

15. A flight computer adapted to;

obtain information on a wake produced by a leader aircraft and experienced by a follower aircraft by;

providing a model simulating a dynamic behavior of the follower aircraft, the model operating on variables representing the following six degrees of freedom of the follower aircraft: position on a longitudinal axis, position on a transverse axis, position on a height axis, angle of roll, angle of pitch, and angle of yaw, the model further operating on time derivatives of the six degrees of freedom;

repetitively carrying out the following three operations in an iterative manner:

using the model simulating the dynamic behavior of the follower aircraft to simulate a response of the follower aircraft to an estimated aerodynamic context exclusively based on data only from the follower aircraft free from any data communicated by the leader aircraft, an estimated position of the follower aircraft with respect to a model of the wake, and data indicating aerodynamic effects experienced by the follower aircraft due to motion of the follower aircraft;

estimating measurements carried out by the follower aircraft based on the simulated response of the follower aircraft to the estimated aerodynamic context, whereby the measurements that are estimated are dependent on the position of the follower aircraft relative to the wake; and adjusting the estimated aerodynamic context based on a comparison between the measurements that have been estimated and actual measurements carried out by the follower aircraft to reduce a deviation between the measurements that have been estimated and the actual measurements;

extracting the information on the wake from the estimated aerodynamic context; and using the information on the wake obtained to define a target for a flight controller in the follower aircraft.

* * * * *